(12) United States Patent
Ishiwata et al.

(10) Patent No.: US 7,202,439 B2
(45) Date of Patent: Apr. 10, 2007

(54) SMALL-HOLE ELECTRICAL DISCHARGE MACHINING DEVICE AND MULTIPLE DIESINKING-AND-SMALL-HOLE ELECTRICAL DISCHARGE MACHINING DEVICE, AND METHOD FOR MULTIPLE DIESINKING-AND-SMALL-HOLE ELECTRICAL DISCHARGE MACHINING WITH THE SAME DEVICE

(75) Inventors: Hiroshi Ishiwata, Sagamihara (JP); Shigeharu Yokomichi, Atsugi (JP)

(73) Assignee: Elenix, Inc., Kanagawa-Ken (JP)

( * ) Notice: Subject to any disclaimer, the term of this patent is extended or adjusted under 35 U.S.C. 154(b) by 149 days.

(21) Appl. No.: 10/866,815

(22) Filed: Jun. 15, 2004

(65) Prior Publication Data
US 2004/0262266 A1 Dec. 30, 2004

(30) Foreign Application Priority Data
Jun. 17, 2003 (JP) .......................... P2003-172125

(51) Int. Cl.
*B23H 1/10* (2006.01)
*B23H 7/36* (2006.01)

(52) U.S. Cl. ................. 219/69.14; 137/577; 219/69.17; 219/69.2

(58) Field of Classification Search ............. 219/69.11, 219/69.14, 69.2, 69.17; 137/577, 581, 577.5, 137/578, 579
See application file for complete search history.

(56) References Cited

U.S. PATENT DOCUMENTS

| | | | |
|---|---|---|---|
| 4,755,651 A * | 7/1988 | Tsutsui et al. | 219/69.14 |
| 5,223,688 A * | 6/1993 | Hosoda et al. | 219/69.11 |
| 5,290,987 A * | 3/1994 | Davis et al. | 219/69.11 |
| 5,386,094 A * | 1/1995 | Kawai et al. | 219/69.14 |
| 5,739,497 A * | 4/1998 | Tanaka | 219/69.2 |
| 6,127,642 A * | 10/2000 | Gleason et al. | 219/69.2 |
| 6,576,858 B1 | 6/2003 | Yokomichi | |
| 6,717,094 B2 * | 4/2004 | Beaumont | 219/69.14 |

(Continued)

FOREIGN PATENT DOCUMENTS

JP 58-94934 6/1983

(Continued)

OTHER PUBLICATIONS

English language Abstract of JP 2002-307248.

(Continued)

*Primary Examiner*—Geoffrey S. Evans
(74) *Attorney, Agent, or Firm*—Greenblum Bernstein, P.L.C.

(57) ABSTRACT

A small-hole electrical discharge machining device comprises a diaphragm which can be moved up and down along a notch window provided in a work tank for mounting a work in the work tank in which a working fluid can be filled or discharged, and adjusts the height of the working fluid; a W-axis slide which can be moved up and down, and having an electrode guide in the lower end portion; a master cylinder which is moved up and down corresponding to up-and-down movement of the W-axis slide; and a slave cylinder which is connected with the master cylinder through a pipeline and with a diaphragm driving mechanism, and wherein the diaphragm is moved up and down corresponding to up and down movement of the W-axis slide.

10 Claims, 9 Drawing Sheets

U.S. PATENT DOCUMENTS 6,791,053 B2 * 9/2004 Sugiyama et al. ....... 219/69.14
2002/0148814 A1 10/2002 Ishiwata et al.

FOREIGN PATENT DOCUMENTS

| JP | 59-152027 | | 8/1984 |
| JP | 61-270023 | A * | 11/1986 |
| JP | 7-1249 | | 1/1995 |
| JP | 11-77435 | A * | 3/1999 |
| JP | 2002-307248 | | 10/2002 |
| WO | WO-03/049891 | A1 * | 6/2003 |

OTHER PUBLICATIONS

English Language Abstract of JP 7-1249.
English Language Abstract of JP 58-94934.
English Language Abstract of JP 59-152027.

* cited by examiner

SMALL-HOLE ELECTRICAL DISCHARGE MACHINING DEVICE AND MULTIPLE DIESINKING-AND-SMALL-HOLE ELECTRICAL DISCHARGE MACHINING DEVICE, AND METHOD FOR MULTIPLE DIESINKING-AND-SMALL-HOLE ELECTRICAL DISCHARGE MACHINING WITH THE SAME DEVICE

CROSS REFERENCE TO RELATED APPLICATIONS

This application is based upon and claims the benefit of priority from the Japanese Patent Applications No. 2003-172125, filed on Jun. 17, 2003 in the Japanese Patent office; the entire contents of which are incorporated herein by reference.

BACKGROUND OF THE INVENTION

1. Field of the Invention

This invention relates to a small-hole electrical discharge machining device and a multiple diesinking-and-small-hole electrical discharge machining device, and a method of multiple diesinking-and-small-hole electrical discharge machining by using the same device.

2. Description of the Related Art

There is a demand for electrical discharging machining on a various face of a work to be machined in a work tank which is filled with a working fluid comprising oil and water. In such case, heretofore, a small-hole electrical discharge machining device having a work tank which can be freely tilted by a turntable, in other words the work can be appropriately tilted in the work tank filled with the above-described working fluid (for example, the Japanese Patent Application Publication No. 2002-307248 as a related art).

In the above-described small-hole electrical discharge machining device, when electrical discharge machining is performed at respective positions at different depths from the level of the working fluid while the turntable is tilted, a position of a gate (overflow gate) which discharges the working fluid appropriately is required to be adjusted by hand so that the height of the working fluid is set at a little upper position from a work section according to a height of the working position (a depth from the level of the working fluid) because a Z-axis servo or an electrode guide goes under the working fluid when the working position is at a deeper depth than that of the fluid level. Accordingly, it is difficult to execute automatic continuous operation for electrical discharge machining.

There has also been another method of adjusting the height of the working fluid by using an over flow gate which is provided in a work tank, and which moves upwardly and downwardly in the work tank powered by a servo motor. However, even in this method, it is difficult to prepare programs when a work has a complex shape. Here, the height of the working fluid means a depth from the bottom of the work tank to the level of the working fluid.

Moreover, according to a conventional method of electrical discharge machining for manufacturing a complex-shaped work as shown in FIGS. 1A through 3B, in which diesinking sections 100A 200A, and 300A are formed in, and through holes (small holes) 100B, 200B, and 300B are further formed in the diesinking sections 100A 200A, and 300A, the method comprises: first electrical discharge machining step for performing a diesinking by using an electrode which has been formed into a predetermined diesinking section's shape beforehand. After this step, the electrode is change to a rod-like or pipe-like electrode, and a relative distance between the level of the working fluid and a surface to be machined is adjusted, and thereafter second electrical discharge machining step for forming the through holes 100B, 200B, and 300B is executed. In other words, another step in which the level of the working is adjusted, other than the step for electrical discharge machining, is required. Accordingly, there has been a problem that the total machining time becomes longer and the machining cost is increased.

Moreover, the above-described diesinking has been executed in a working fluid comprising, generally, oil (mineral oil), because the electrode is remarkably consumed. Accordingly, there has also been a problem that the machining time is further increased.

The present invention has been made in order to solve the above-described problems, the object of the invention is to provide a small-hole electrical discharge machining device comprising a mechanism which automatically controls the height of the working fluid corresponding to a height (coordinate values for the W axis) of the working position of a work, a multiple diesinking and small-hole electrical discharge machining device, and a multiple diesinking and small-hole electrical discharge machining method using the same device.

SUMMARY OF THE INVENTION

In order to solve the above-described problems, the device of the present invention comprising: a controller which controls at least up-and-down movement of a rod-like electrode for small-hole machining, and guides an electrode guide guiding the lower end portion of the rod-like electrode; a work tank which reserves a working fluid and machines a work in the working fluid; a working-fluid discharger which is provided in the work tank and discharges the working fluid; a diaphragm which is moved up and down along the discharger and adjusts the height of the working fluid; a hoisting unit which moves the diaphragm up and down corresponding to up and down movement of the electrode guide; and a working-fluid supply unit, which supplies the working fluid to the work, tank, wherein the controller keeps the distance between the fluid level of the working fluid and the electrode guide constant.

DETAILED DESCRIPTION OF THE INVENTION

Hereinafter, one embodiment according to the present invention will be explained, referring to drawings. Here, it is assumed hereafter that the right and left direction, the up and down one, and the back and forth one with regard to the printed surface in FIG. 4 are the X-axis direction, the Z-axis one, and the Y-axis one, respectively.

Figure 4:
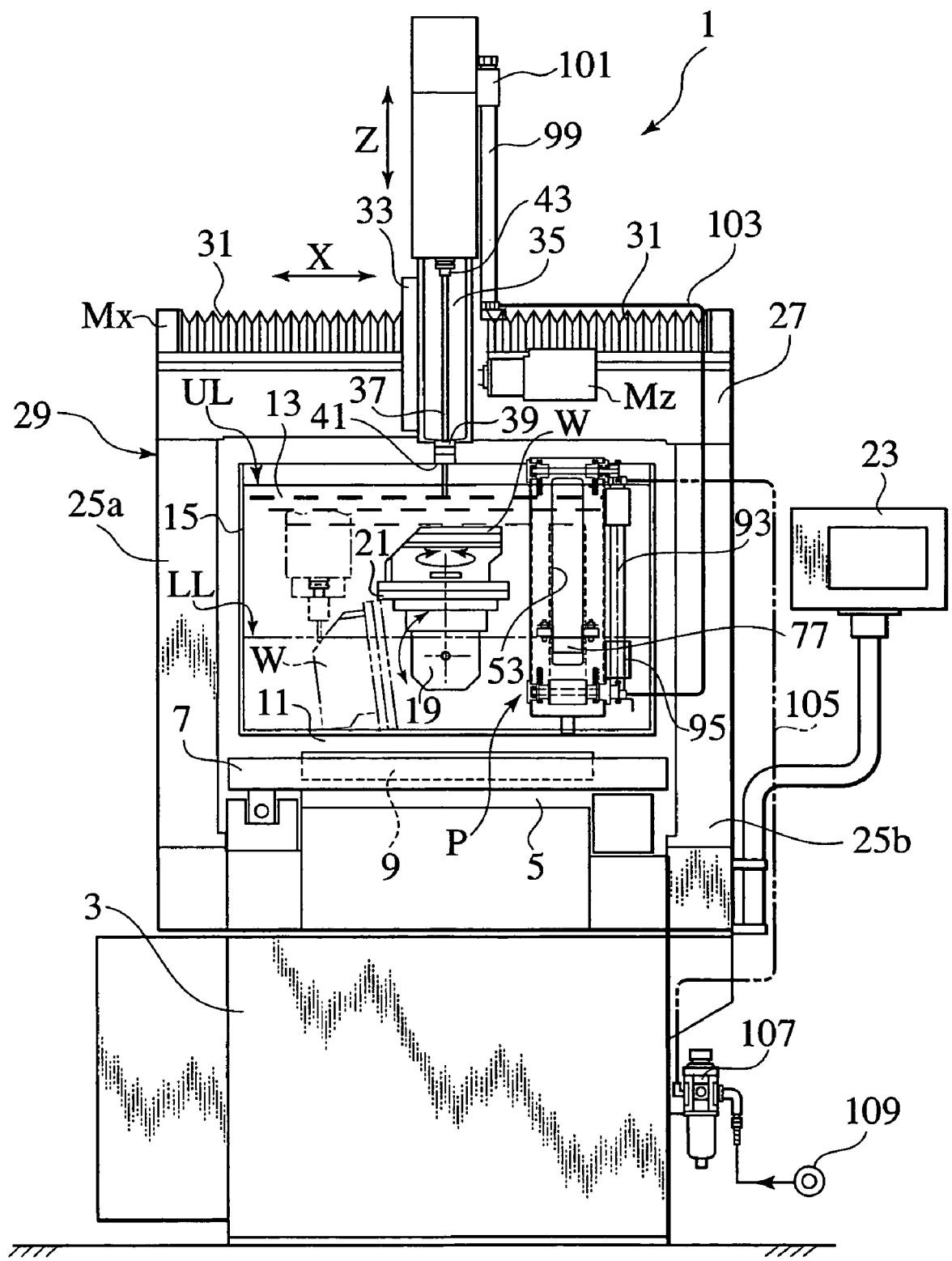
FIG. 4 is a front view explaining a configuration of a small-hole electrical discharge machining device by six-axes (X, Y, W, Z, A, B) control according to the present invention.
Figure 5:
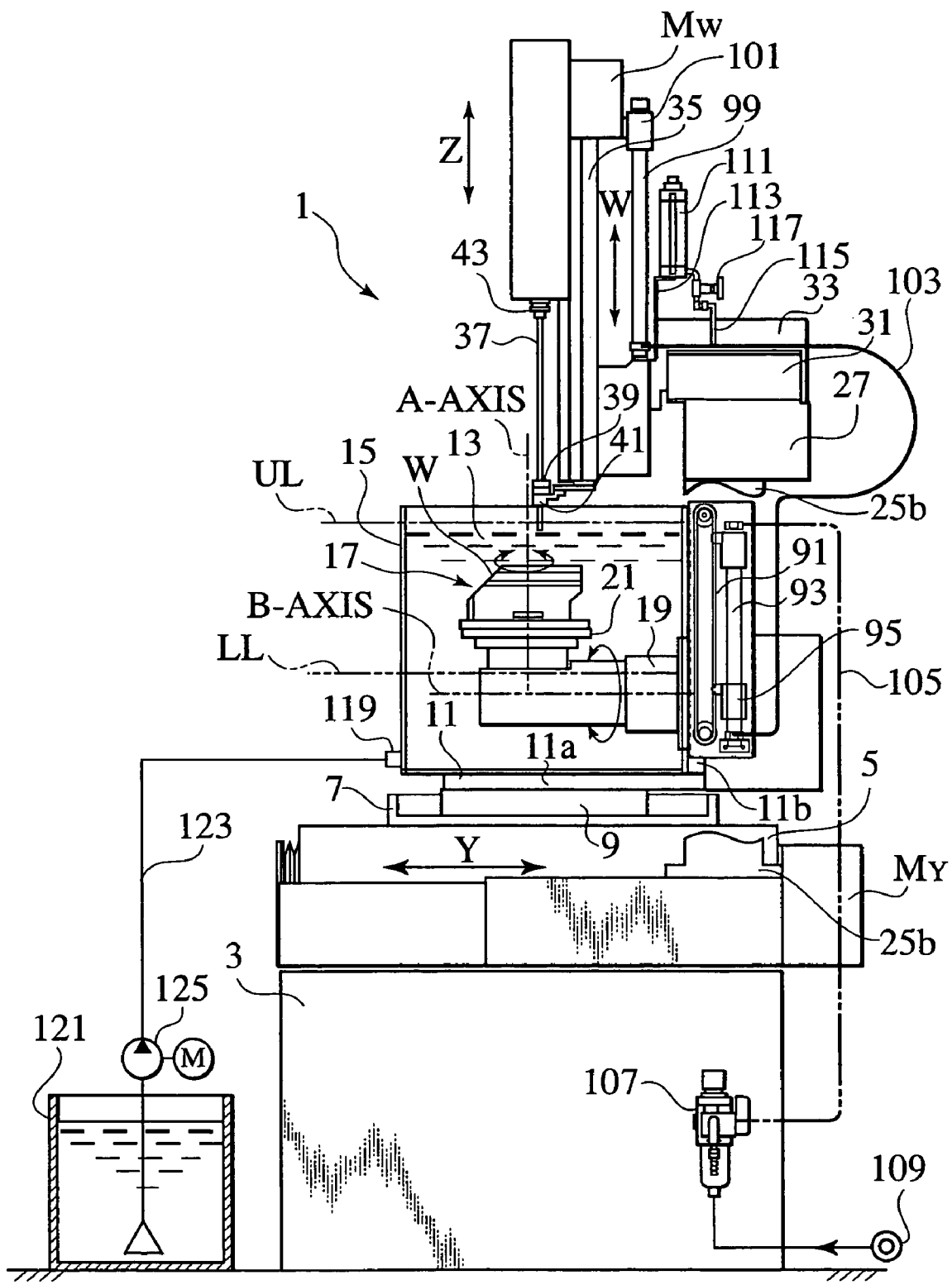
FIG. 5 is a side view of the small-hole electrical discharge machining device shown in FIG. 4.

With reference to FIGS. 4 and 5, a Y-axis table 5 which can be moved and positioned in the Y-axis direction by a driving unit (not shown), and a Y-axis drive motor MY is provided on a base 3 of a small-hole electrical discharge machining device 1.

The Y-axis table 5 further comprises a pan 7 which is integrally provided with the table 5, a bed 9 which is made of an insulating material and is provided on the pan 7, and an L-shaped bracket 11 which is integrally provided on the bed 9.

A work tank 15 being filling with a working fluid 13 such as pure water with a small electrical conductivity is installed on the L-shaped bracket 11, and a well-known turntable device 17, which can tilt and has a function to fix a work W is provided in the work tank 15. Here, the turntable device has been disclosed in, for example, Japanese Patent Application Publication No. 2002-307248.

The turntable device 17 has two degrees of freedom, that is, an A-axis which is parallel to the Z-axis (the up-end down direction in FIGS. 4 and 5), and a B-axis (tilting axis) which is orthogonal to the A-axis (parallel to the Y axis, and orthogonal to the X axis).

The B-axis rotation axis 19 as the B-axis is pivotally mounted on a B-axis mounting portion 11b extending upwards in the Z axis direction from a horizontal bottom section 11a of the L-shaped bracket 11 along a wall at the backside (the right side in FIG. 5) of the work tank 15. The B-axis rotation axis 19 is configured to stretch approximately to the center section in the work tank 15, penetrating through the backside wall of the work tank 15.

With reference to FIG. 5, a turntable 21 is rotatably installed through reduction gears (not shown) on the upper portion of the B-axis rotation axis 19 at the left end. The B-axis rotation axis 19 is rotated by a B-axis driving motor (not shown) provided outside the work tank 15. Moreover, the turntable 21 is rotated by an A-axis driving motor (not shown) through a "blind hole" (not shown) which is installed along the shaft center of the B-axis rotation axis 19 and is open to the outside.

An annular conducting ring (not shown) is provided on the back of the turntable 21. The turntable 21 is also connected to an electrical discharge power supply (not shown) through the annular conducting ring.

In the above-described configuration, the A-axis driving motor can be appropriately driven and rotated by a controller 23 to rotate the turntable 21 a desired angle about the A-axis.

Moreover, when the B-axis driving motor is appropriately driven in the forward or reverse direction by the controller 23, the turntable 21 is tilted clockwise or counterclockwise in FIG. 4. Furthermore, the turntable 21 can be positioned at an arbitrary position in the Y-axis direction by appropriate driving of the Y-axis driving motor MY for rotation.

A frame 29 comprising right and left struts 25a and 25b, and a beam member 27 horizontally suspended on the right and left struts 25a and 25b is fixed to the base 3 at the backside of the work tank 15 (the right side in FIG. 5). An X-axis guide rail (not shown) protected with a cornice 31 is installed on the beam member 27 of the portal frame 29, and an X-axis carriage 33 is movably provided on the X-axis guide rail.

A W-axis slide 35 is engaged with the X-axis carriage 33 so that the W-axis slide 35 can be moved up and down along the W-axis parallel to the Z-axis. The W-axis slide 35 is provided so that the W-axis slide 35 can be positioned at an arbitrary position of the W-axis by a W-axis driving motor MW provided on the upper end portion of the slide 35.

Moreover, an electrode guide holder 41 equipped with an electrode guide 39 which guides a solid or hollow electrode 37 for machining a small hole in the Z-axis direction is provided on the lower end portion of the W-axis slide 35. Furthermore, an electrode holding unit 43, which is equipped with the rod-like electrode 37 in a detachable manner, is guided by the W-axis slide 35 so that the electrode holding unit 43 can be moved up and down in the Z-axis direction, and the electrode holding unit 43 is provided so that the electrode holding unit 43 can be moved and positioned at an arbitrary position of the Z-axis by a Z-axis driving motor MZ provided on the W-axis slide 35.

Here, the X-axis carriage 33 is provided so that the X-axis carriage 33 can be positioned at an arbitrary position of the X-axis by an X-axis driving motor MX provided on the beam member 27 of the frame 29.

Moreover, a motor (not shown), which rotates the rod-like electrode 37 around the shaft center thereof, is provided for the solid or hollow rod-like electrode 37, and a working-fluid supply unit (not shown), which supplies the working fluid (pure water and the like), is further provided for the hollow rod-like electrode.

In the above-described configuration, the W-axis slide 35 can be positioned at a desired position on the Z-axis by rotating the W-axis driving motor MW through the controller 23. That is, the electrode guide 39 which guides the solid or hollow rod-like electrode 37 in the Z-axis direction can be positioned at an appropriate position on the Z-axis.

Moreover, the solid or hollow rod-like electrode 37 held in the electrode holding unit 43 can be moved and positioned at an arbitrary position on the Z-axis by the Z-axis driving motor MZ.

Furthermore, since the X-axis carriage 33 can be positioned at an arbitrary position on the X-axis by the X-axis driving motor MX, the rod-like electrode 37 can be moved and positioned at an arbitrary position on the X and Y coordinates of the work W. Moreover, since the work W can be rotated about the A-axis and B-axis, an arbitrary surface of the work W can be machined. Here, the work W shown with the dotted line in FIG. 5 shows one example in which the work is rotated about the B-axis.

Then, a diaphragm 77 which adjusts the height of the working fluid in the work tank 15, and a diaphragm driving mechanism (hoisting unit) which moves the diaphragm up and down will be explained.

Figure 8:
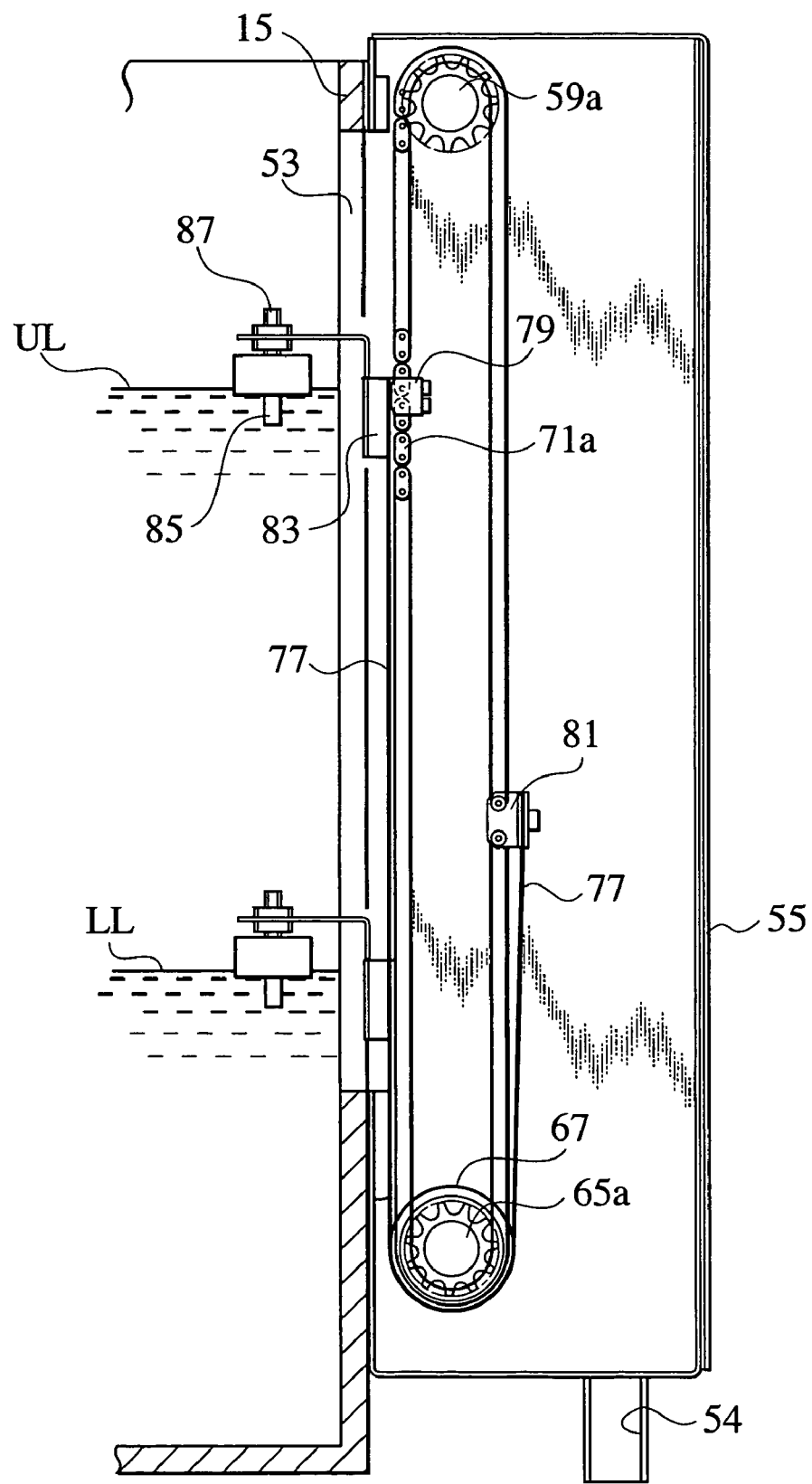
FIG. 8 is a sectional view taken along the VIII—VIII line in FIG. 6.
Figure 9:
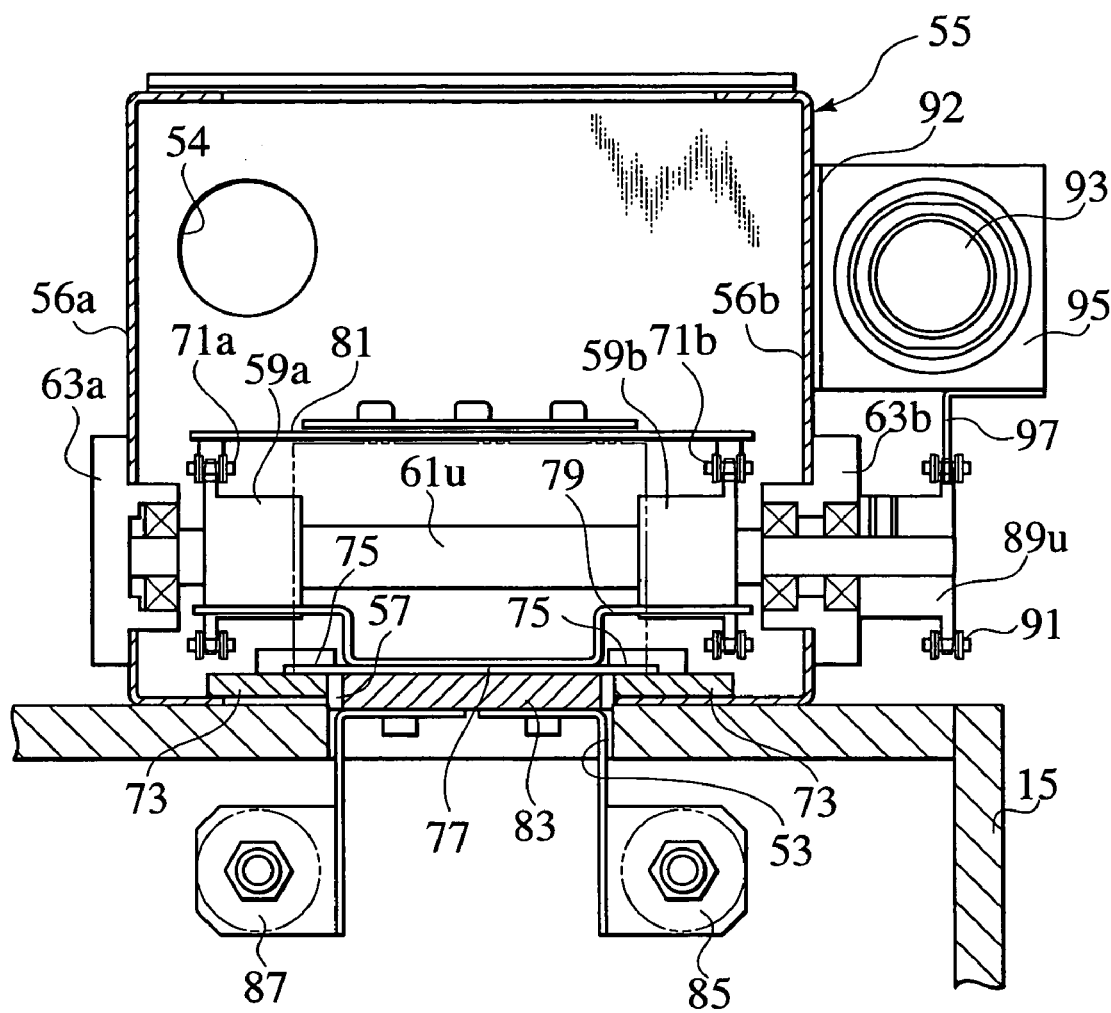
FIG. 9 is a sectional view taken along the IX—IX line in FIG. 6.

As shown in FIGS. 4, 8, and 9, the diaphragm 77 is provided on the sidewall at the right side and the backside of the work tank 15 (the right side in FIG. 8). At the right of the backside of work tank 15, a notch window (working-fluid discharger) 53 which discharges the working fluid is extended in up and down direction (in the Z-axis direction).

Outside the notch window 53, a reserving tank 55 with an approximately rectangular cross section is fixed as one body with a suitable method such as bolting connection, and the reserving tank 55 pools the working fluid being overflowed from the work tank 15. A notch window 57 with an approximately similar shape to that of the notch window 53 provided in the work tank 15 is formed in the reserving tank 55. A drain opening 54 communicating with a working fluid supply tank 121 is installed on the bottom of the reserving tank 55.

As described later, the working fluid discharger 53 in the work tank 15 is opened or closed by up and down movement of the diaphragm under control of the controller 23. A part of the working fluid which is not required for keeping the depth of the working fluid at a desired one is discharged from the notch window 57, in a state that the discharger 53 and the notch window 57 are communicated with each other.

As seen from FIG. 10, the diaphragm driving mechanism (hoisting unit) which moves the diaphragm 77 up and down functions through a chain mechanism comprising three chains (will be described later) which is rotated by a slave cylinder 93 connected to a master cylinder 99 through pipelines (will be described later). Hereinafter, the diaphragm driving mechanism will be explained in detail.

Figure 6:
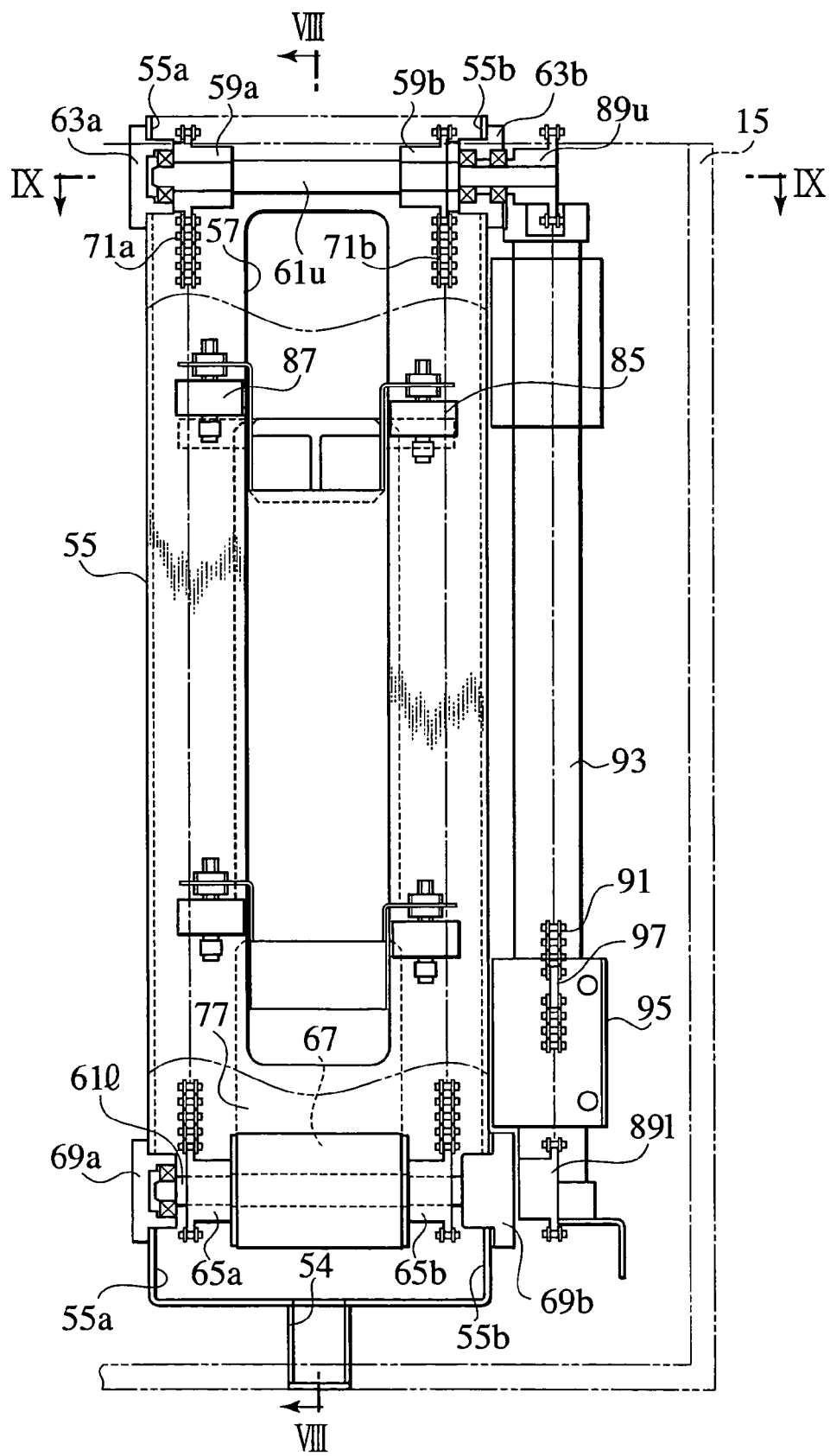
FIG. 6 is a detailed view of the P portion shown in FIG. 4.

As seen from FIGS. 6, 8, and 9, a rotation axis 61*u* which is extended in approximately parallel and horizontal to the work tank 15 is rotatably provided at bearings 63*a* and 63*b* which are provided on right and left side walls 55*a* and 55*b* at the upper portion of the notch window 57 of the reserving tank 55. A pair of sprockets 59*a* and 59*b* is fixed at both of the end portions of the rotation axis 61*u* by an appropriate method. The end portions are located at the outside of the central portion with a slightly wider breadth than that of the notch window 57 in the right and left direction.

Moreover, a rotation-axis 61*l* which is horizontally extended in parallel to the rotation axis 61*u* is rotatably provided at bearings 69*a* and 69*b* which are provided on the right and left side walls 55*a* and 55*b* at the lower portion of the notch window 57 of the reserving tank 55, and a pair of sprockets 65*a* and 65*b* is fixed at positions opposite and parallel to the pair of sprockets 59*a* and 59*b* by an appropriate method.

A roller 67 is rotatably fitted on the rotation axis 61*l* between the sprockets 65*a* and 65*b*. Moreover, first loop type chains 71*a* and 71*b* are wound between the sprockets 59*a* and 65*a*, and the sprockets 59*b* and 65*b*, respectively.

There is provided a guide member 73 extending up and down along both sides of the notch window 57 installed on the reserving tank 55. A guide groove 75 is provided opposite to the guide member 73, and both ends of the diaphragm 77 in the longitudinal direction are slidably engaged with the guide groove 75. Here, the diaphragm 77 is formed in an approximately rectangular shape, and made of an elastic member such as a thin steel plate.

The lower portion of the diaphragm 77 is wound on the roller 67 approximately in U-shaped, and the upper end of the diaphragm 77 at the side of the guide member 73 is connected with the first loop type chains 71*a* and 71*b*, which are running at the side of the work tank 15, through a connecting plate 79. As described above, since the diaphragm 77 comprises a flexible member and is wound approximately in U-shaped, the diaphragm with a desired length can be provided in a small space.

Moreover, the upper end of the diaphragm 77 at the other side is connected with the first loop type chains 71*a* and 71*b*, which are running at the back side, through a connecting plate 81.

A first float switch 85 (a first fluid-level detecting unit), which is protruded into the inside of the work tank 15 through a spacer 83 provided on the connecting plate 79, for detecting the fluid level, and a second float switch 87 (a second fluid-level detecting unit) which detects the fluid level at a slightly upper position than that of the first float switch 85 are fitted at the upper portion of the diaphragm 77 guided by the guide member 73. Here, signals being detected by the one pair of the fluid-level detecting units are output to the controller 23, respectively.

As shown in FIGS. 6 and 9, the upper and lower rotation axes 61*u* and 61*l* are provided so that the axes 61*u* and 61*l* are protruded from the bearings 63*b*, 69*b*, which pivot the right sides of the rotation axes 61*u* and 61*l*, respectively, to the outside of the reserving tank 55, and sprockets 89*u* and 89*l* are provided on the protruded axis ends.

A second loop type chain 91 is engaged with the sprockets 89*u* and 89*l*, and the chain 91 rotates the axes 61*u* and 61*l*. A slide 95, which is fixed at the outside of the reserving tank 55 through a bracket 92, of the slave cylinder 93 comprising a rod-less cylinder is connected with the second loop type chain 91 through a bracket 97.

As shown in FIGS. 4 and 5, the master cylinder 99 comprising a rod-less cylinder is vertically provided on the X-axis carriage 33. And, a slide 101 of the master cylinder 99 is fixed on the upper portion of the W-axis slide 35.

As shown in FIG. 5, fluid chambers (not shown) filled with operation oil are provided in cylinder tubes at the lower portions of the slide 101 of the master cylinder 99 and the slide 95 of the slave cylinder 93. The fluid chamber (not shown) of the master cylinder 99 and the fluid chamber (not shown) of the slave cylinder 93 are connected with each other through a pipeline 103.

Moreover, an air chamber (not shown) is provided above the slide 95 of the slave cylinder 93, and the air chamber (not shown) above the slave cylinder 93 is connected with a pneumatic source 109 through a pipeline 105 and a regulator 107.

Here, the air chamber (not shown) of the master cylinder 99 is configured to be open to the air.

Furthermore, an operation-oil replenish tank 111 is fitted, through a bracket 113 above the X-axis carriage 33, at a position of an approximately same level to that of the fluid chamber (not shown) of the master cylinder 99, and the operation-oil replenish tank 111 and the pipeline 103 are connected with each other through a pipeline 115. Moreover, a stop valve 117 is provided between the operation-oil replenish tank 111 and the pipeline 115.

The operation oil is filled from the operation oil replenish tank 111 to the fluid chambers of the master cylinder 99 and the slave cylinder 93 and the pipelines 103, and, 115, and, when the filling is completed, the stop valve 117 is closed to prevent back flow of the operation oil to the operation-oil replenish tank 111.

As seen from FIG. 6, a supply port 119 through which the working fluid is supplied is provided at the bottom of the work tank 15. The supply port 119 and the working fluid supply tank 121 are connected with each other through a pipeline 123. Moreover, a pump 125 for supply of the working fluid and a motor M which drive the pump 125 are provided on the pipeline 123.

Hereinafter, there will be explained operations by which electrical discharge machining is executed in the small-hole electrical discharge machining device 1 with the above-described configuration, using the controller 23. Here, the following steps are processed by control programs, which have been stored in a storage device of the controller 23 beforehand.

In the first place, the W-axis slide 35 is driven by the W-axis driving motor MW under control of the controller 23 to lower the electrode guide 39 to a predetermined working position in order to machine a work W fixed on the turntable 21 (First Step).

When the W-axis slide 35 is lowered to the predetermined position, the slide 101, which is fixed to the W-axis slide 35, of the master cylinder 99 is lowered together with the W-axis slide 35 (Second Step). As a result, the operation oil in the fluid chamber of the master cylinder 99 flows into the fluid chamber of the slave cylinder 93 to raise the slide 95 of the slave cylinder 93.

Figure 7:
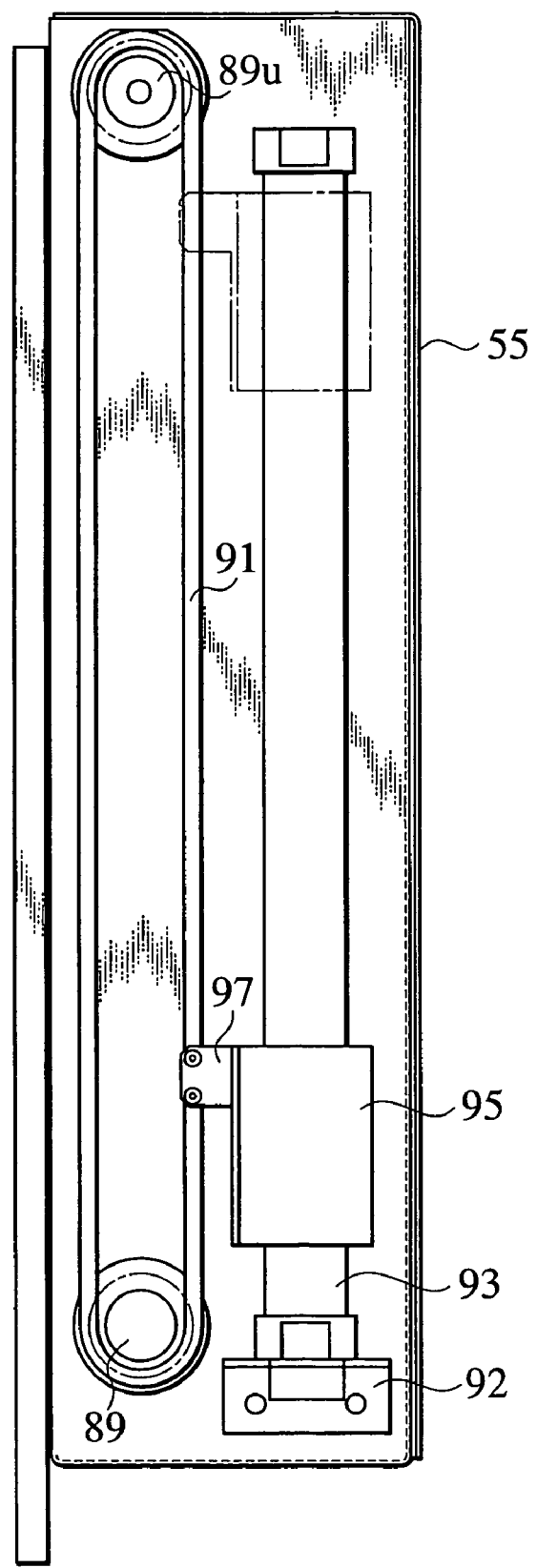
FIG. 7 is a side view from the right side for the P portion shown in FIG. 6.

Accordingly, the second loop type chain 91 is raised together with the slide 95, and the chain 91 is rotated counterclockwise (in FIGS. 5 and 7). The first loop chains 71a and 71b are similarly rotated counterclockwise (in FIG. 8) in synchronization with the rotation of the second loop type chain 91, and the diaphragm 77 fixed to the first loop chains 71a and 71b through the connecting plate 79 is lowered (Third Step). Here, at this step, an excess working fluid is discharged into the reserving tank 55 through the discharger 53 and the notch window 57.

Then, the working fluid 13 is filled from the working fluid supply tank 121 to the level of the first float switch 85 in the work tank 15, where the level is slightly higher than the surface of the work W. When the first float switch 85 is turned on, and thereafter supply of the working fluid 13 is stopped (Forth Step).

Since the moving amount of the W-axis slide 35 is proportional to that of the diaphragm 77, electrical discharge machining can be performed at any time in a state that the relative distance between the position of the electrode guide 39 and the fluid level is constant. Here, it is shown in FIG. 8 that the upper limit and the lower one of the level of the working fluid level are UL, and LL, respectively.

Moreover, since an appropriately-adjusted air pressure is applied to the air chamber provided above the slide 95 of the slave cylinder 93 the piston of the slave cylinder 93 is forced to be pushed up by the slide 35 when the W-axis slide 35 is raised, and the pressure in the cylinder is prevented from becoming a negative pressure.

Moreover, when the W-axis slide 35 is raised, the working fluid 13 is supplied from the working fluid supply tank 121 to the work tank 15. At this time, when the first float switch 85 for detecting the fluid level is turned on, and thereafter supply of the working fluid is stopped to keep the constant distance between the position of the electrode guide 39 and the fluid level.

Here, when discharge of the working fluid is delayed, an electrode head can be prevented from going under the fluid by setting that lowering of the W-axis slide 35 is stopped when a fluid level is detected by the second float switch 87 which detects the fluid level at a slightly upper position than that of the first float switch 85, and the switch 87 is turned on.

Then, multiple diesinking-and-small-hole electrical discharge-machining devices according to an embodiment of the present invention will be explained.

Figure 10:
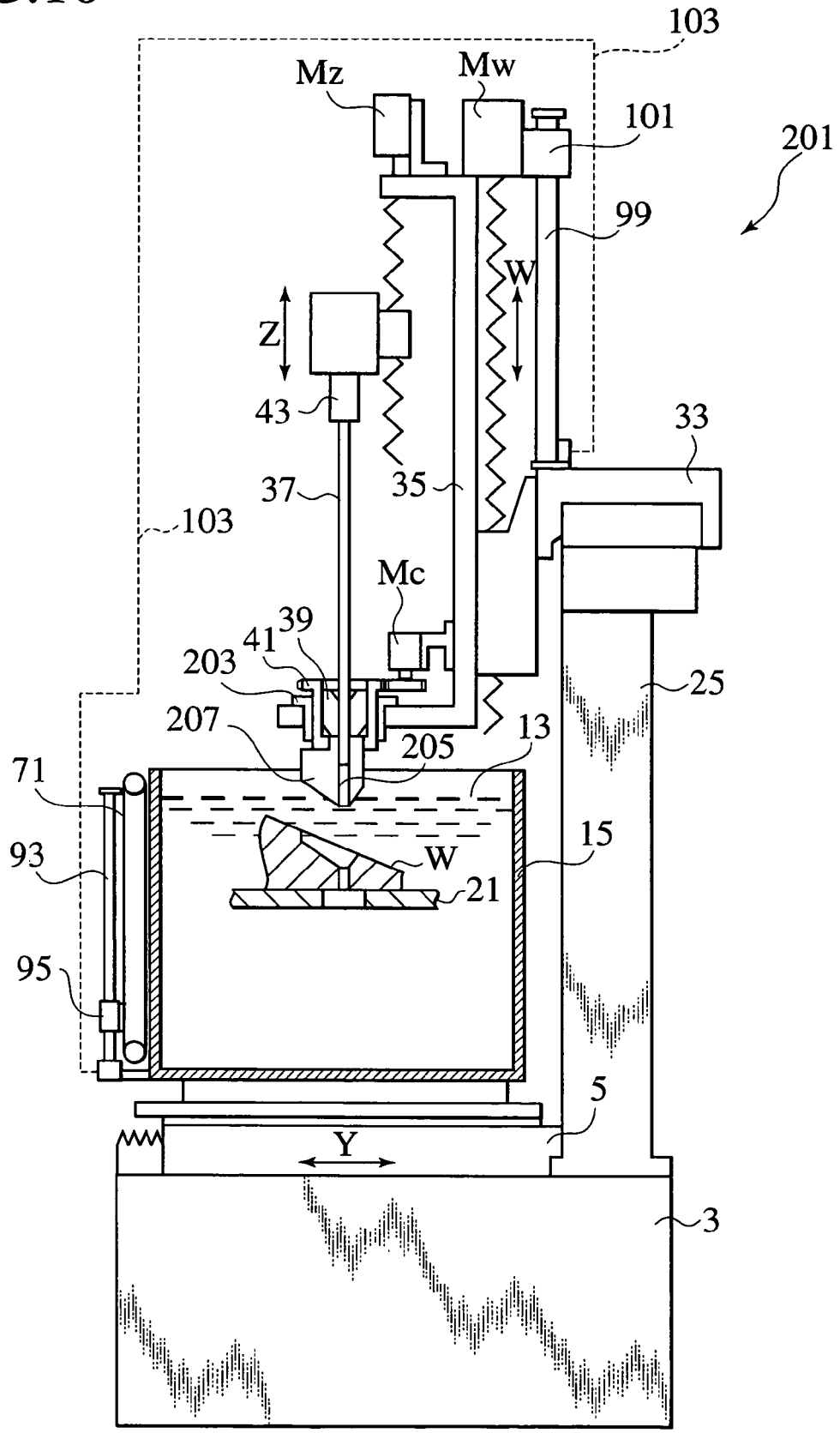
FIG. 10 is an exemplary view explaining a configuration of a multiple diesinking and small-hole electrical discharge machining device by six-axes (X, Y, W, Z, A, B) control according to the present invention.

FIG. 10 is an exemplary view explaining a configuration of a multiple diesinking-and-small-hole electrical discharge-machining device 201 according to the present invention. Since axes of X, Y, Z, and W, and a configuration of a mechanism by which the diaphragm 77 is moved up and down in the work tank 15 are common to those of the small-hole electrical discharge machining device 1 in the multiple diesinking-and-small-hole electrical discharge machining device 201, common parts are denoted by the same reference numbers, and the detailed description will be omitted.

A guide sleeve 203 is provided at the lower end portion of the W-axis slide 35, and the electrode guide holder 41 provided with the electrode guide 39 engages with the guide sleeve 203 so that the holder 41 can be rotated about the Z-axis as a shaft center. And, a forming electrode 207 for diesinking includes a through hole 205 into which the rod-like electrode 37 can be penetrated, and the electrode 207 is provided at the lower portion of the electrode guide holder 41 in a detachable manner.

Moreover, a toothed gear is formed on a flange section at the upper portion of the electrode guide holder 41, and a C-axis driving motor MC comprising a pinion gear being engaged with the toothed gear is provided on the W-axis slide 35.

There will be explained a case in which a small hole is formed, using the above-described configuration, at one end of a formed hole such as a counter boring hole, a counter sinking hole, or an indefinite hole, as shown in FIGS. 1A through 3B.

Figure 1A:
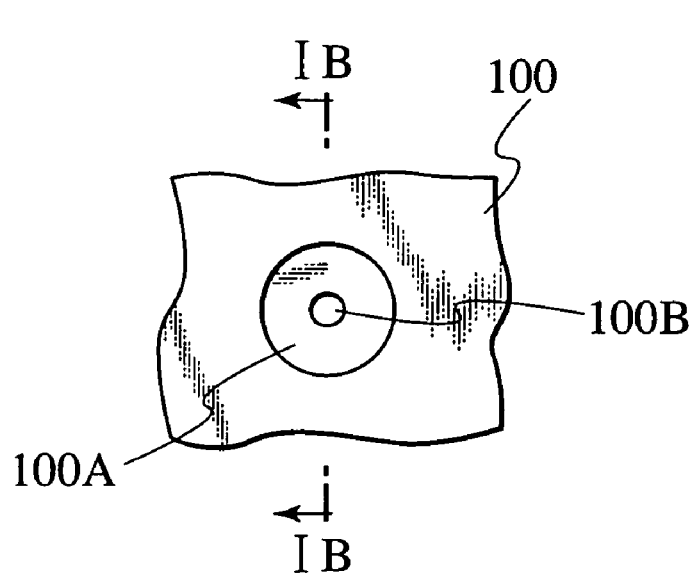
FIG. 1A shows a top view of an example of a work which has a small hole at one end of a counter boring hole by diesinking electrical discharge machining.
Figure 1B:
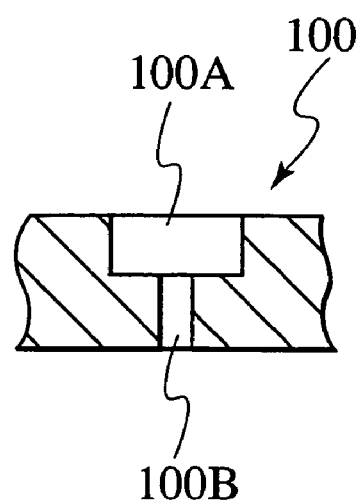
FIG. 1B is a sectional view taken along the IB—IB line in FIG. 1A.
Figure 2A:
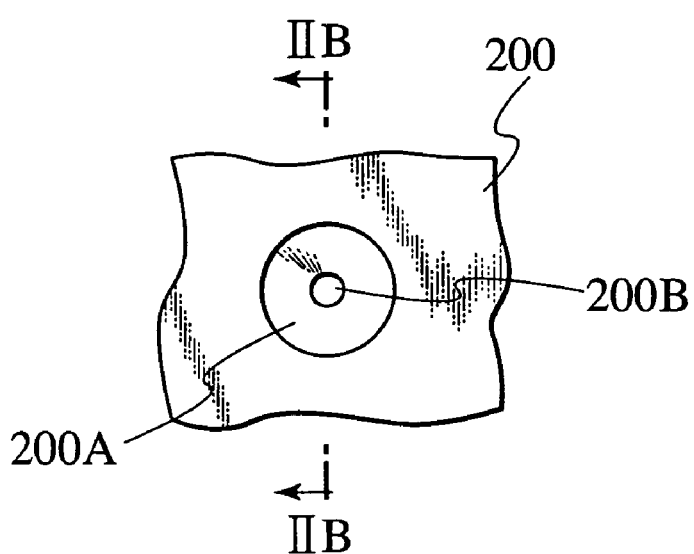
FIG. 2A shows a top view of an example of a work which has a small hole at one end of a counter sinking hole formed by diesinking electrical discharge machining.
Figure 2B:
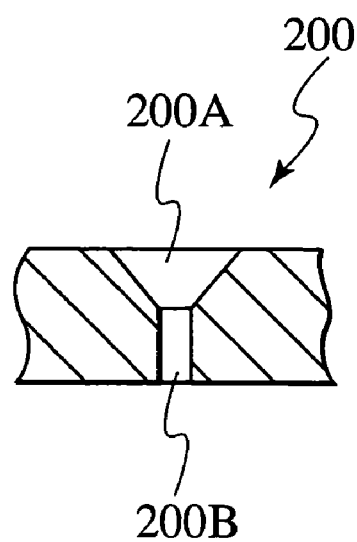
FIG. 2B is a sectional view taken along the IIB—IIB line in FIG. 2A.
Figure 3A:
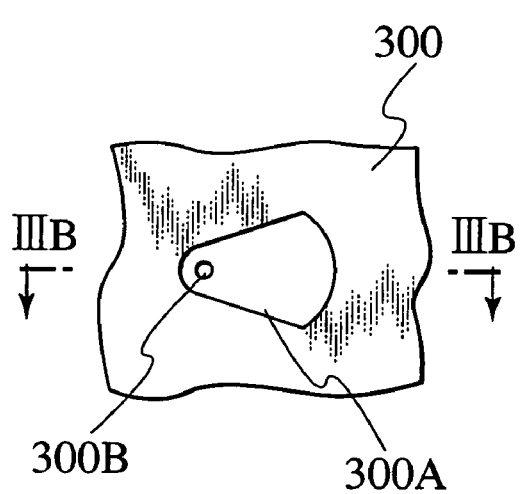
FIG. 3A shows a top view of an example of a work which has a small hole at one end of an indefinite hole formed by diesinking electrical discharge machining.
Figure 3B:
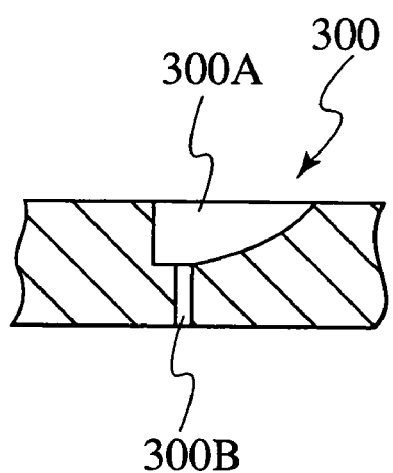
FIG. 3B shows a sectional view taken along the IIIB—IIIB line in FIG. 3A.
Figure 11A:
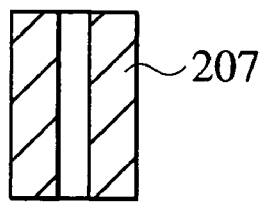
FIG. 11A shows an example of an electrode which is used when diesinking electrical discharge machining and small-hole electrical discharge machining are simultaneously executed, and is a sectional view of the electrode for machining the counter boring hole shown in FIG. 1A.
Figure 11B:
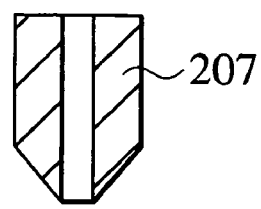
FIG. 11B shows an example of an electrode which is used when diesinking electrical discharge machining and small-hole electrical discharge machining are simultaneously executed, and is a sectional view of the electrode for machining the counter diesinking hole shown in FIG. 1B.
Figure 11C:
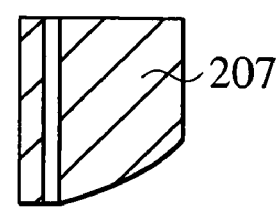
FIG. 11C shows an example of an electrode, which is used when diesinking electrical discharge machining and small-hole electrical discharge machining are simultaneously executed, and is a sectional view of the electrode for machining the indefinite hole shown in FIG. 1C.

In the first operation, forming processing is performed by servo feed control with regard to the W-axis, using the forming electrode 207 provided, as shown in FIGS. 11A through 11C, with the through hole 205 into which the rod-like electrode 37 for forming a small hole can be penetrated. Here, if the C-axis driving motor MC is used at this time, a shape obtained by appropriate rotation of the forming electrode 207 about the Z-axis can be acquired by rotation of the motor MC about the C-axis.

Then, the pipe electrode 37 is moved by Z-axis servo control in the direction of the work W for forming a small hole.

It is obvious also in this case that, when discharge of the working fluid is delayed, the electrode head can be prevented from going under the fluid by setting that lowering of the W-axis slide 35 is stopped by the controller 23 when the fluid level is detected by the second float switch 87, and the switch 87 is turned on.

A small hole can be formed at one end of a formed hole, such as a counter boring hole, a counter sinking hole, or an indefinite hole, in an extremely easy way by the above-described steps.

Moreover, when the degrees of the turntable 21 are configured to be rotation about an A-axis in which a shaft center parallel to the Z-axis is a center of rotation, and one about a B-axis (tilting axis) in which a shaft center orthogonal to the A-axis is a center of rotation, similar forming can be also easily performed for a surface which is not orthogonal to the Z-axis.

Moreover, even when the height of the work in the Z-axis direction is changed due to the tilting function of the turntable 21, electrical discharge machining can be performed at any time in a state that the relative distance between the position of the electrode guide 39 and the fluid level is constant, and, continuous automatic operation can be also realized, because the lowering amount of the W-axis slide 35 is proportional to that of the diaphragm 77 as described above.

According to an aspect of the present invention, the distance between a fluid level and a working position can be kept constant because the height of a working fluid is moved up and down corresponding to a W-axis slide. Accordingly, continuous automatic operation can be realized without downtime based on changing setting of the fluid level even when a work with working positions at different heights from one another is formed.

Moreover, man-hours for making complex programs can be reduced because numerical control of the height of the working fluid is not required even when a work has a complex shape.

According to another aspect of the present invention, the vertical height of a diaphragm driving mechanism can be reduced because there is provided a diaphragm which adjusts the height of a working fluid and is provided in U-shaped.

According to still another aspect of the present invention, which has a configuration in which two float switches for detecting a fluid level are provided on a diaphragm and detect different fluid levels from each other, even when discharge of the working fluid is delayed in comparison with the lowering speed of a W-axis slide, an electrode head can be prevented from going under the fluid by setting that lowering of the W-axis slide is stopped when a fluid level is detected by one float switch which detects the fluid level at a slightly upper position than that by another float switch.

According to further another aspect of the present invention, electrical discharge machining of a small hole, which a rod-like electrode can penetrate, at one end of a formed hole after diesinking can be performed with a same machine at a time. Thereby, total forming time can be remarkably reduced. Moreover, the forming cost can be reduced. Furthermore, the forming time can be reduced because forming is performed in water.

What is claimed is:

1. A small-hole electrical discharge machining device, comprising:
    a controller which controls vertical movement of a rod electrode for small-hole machining, and guides an electrode guide guiding a lower end portion of the rod electrode;
    a work tank which reserves a working fluid in which a work is machined;
    a working-fluid discharger which is provided in the work tank and discharges the working fluid;
    a diaphragm which moves vertically along the discharger and adjusts a height of the working fluid;
    a hoisting unit which moves the diaphragm vertically in response to vertical movement of the electrode guide; and
    a working-fluid supply unit, which supplies the working fluid to the work tank, wherein
    the controller keeps a distance between a fluid level of the working fluid and the electrode guide constant.

2. The small-hole electrical discharge machining device according to claim 1, wherein
    the hoisting unit comprises a master cylinder which operates in correspondence to vertical movement of the electrode guide, and a slave cylinder which is connected with the master cylinder through a pipeline and moves by a same distance as the master cylinder.

3. The small-hole electrical discharge machining device according to claim 1, wherein
    the hoisting unit further comprises one pair of first chains which can be rotated and moved along the working-fluid discharger at both sides thereof,
    wherein a lower end portion of the diaphragm is folded in a U-shaped which rotates around a roller driven by the pair of first chains, and both end portions of an upper portion of the diaphragm are connected with the pair of first chains, and wherein
    a second chain which is driven by the pair of first chains is provided in parallel to the first chains and a slave cylinder is provided in connection with the second chain.

4. The small-hole electrical discharge machining device according to claim 3, wherein
    one pair of fluid-level detecting units, which protrude into the inside of the work tank from the working-fluid discharger, are provided at the upper end portion of the diaphragm and are set so that fluid levels detected by the pair of detecting units are different from each other, and
    detection signals detected by the pair of fluid-level detecting units are output to the controller.

5. The small-hole electrical discharge machining device according to claim 1, wherein
    a turntable in the work tank, to which the work fixes, rotates about an axis parallel to a vertical direction in which the electrode guide moves and about an axis perpendicular to the vertical direction in which the electrode guide moves.

6. A multiple diesinking-and-small-hole electrical discharge machining devices comprising:
    a controller which controls vertical movement of a rod electrode for small hole machining, an electrode guide which guides a lower end portion of the rod electrode and an electrode for diesinking which is provided on the electrode guide, the electrode for diesinking comprising a through hole into which the rod electrode penetrates, and moving vertically in parallel to the rod electrode;
    a work tank which reserves a working fluid in which a work is machined;
    a working-fluid discharger which is provided in the work tank and discharges the working fluid;
    a diaphragm which moves vertically along the discharger and adjusts a height of the working fluid;
    a hoisting unit which moves the diaphragm vertically in response to vertical movement of the electrode guide; and
    a working-fluid supply unit, which supplies the working fluid to the work tank, wherein
    the controller keeps a distance between a fluid level of the working fluid and the electrode guide constant.

7. The multiple diesinking-and-small-hole electrical discharge machining device according to claim 6, wherein the hoisting unit comprises a master cylinder which operates in correspondence to vertical movement of the electrode guide, and a slave cylinder which is connected with the master cylinder through a pipeline and moves by a same distance as the master cylinder.

8. The multiple diesinking-and-small-hole electrical discharge machining device according to claim 6, wherein
a turntable rotates about an axis parallel to a vertical direction in which the electrode guide moves and about an axis perpendicular to the vertical direction in which the electrode guide moves, and moves in a direction perpendicular to the vertical direction in which the electrode guide moves.

9. The multiple diesinking-and-small-hole electrical discharge machining device according to claim 6, wherein
the hoisting unit further comprises one pair of first chains which rotate and move along the working-fluid discharger at both sides thereof,
a lower end portion of the diaphragm is folded in a U-shape and rotates around a roller driven by the one pair of first chains,
both end portions of an upper portion of the diaphragm are connected with the one pair of first chains, and
a second chain which is driven by the one pair of first chains is provided in parallel to the first one pair of chains and a slave cylinder is provided in connection with the second chain.

10. A method for multiple diesinking-and-small-hole electrical discharge machining, which uses an electrical discharge machining device comprising:
a controller which controls vertical movement of a rod electrode for small hole machining, an electrode guide which guides a lower end portion of the rod electrode and an electrode for diesinking electrical discharge machining which is provided on the electrode guide as one body, the electrode for diesinking comprising a through hole into which the rod electrode penetrates, and moving vertically in parallel to the rod electrode;
a work tank which reserves a working fluid in which a work is machined;
a working-fluid discharger which is provided in the work tank and discharges the working fluid;
a diaphragm which moves vertically along the discharger and adjusts a height of the working fluid;
a hoisting unit which moves the diaphragm vertically corresponding to vertical movement of the electrode guide; and
a working-fluid supply unit, which supplies the working fluid to the work tank, the method comprising:
moving the electrode for diesinking and the electrode guide toward the work;
moving the electrode for diesinking and the electrode guide while the hoisting unit is moved in order to keep a distance between the work and the electrode guide constant while a depth of the working fluid is set at a predetermined depth for diesinking electrical discharge machining;
executing diesinking electrical discharge machining;
moving the rod electrode and the electrode guide towards the work;
moving the electrode guide and the rod electrode while the hoisting unit is moved in order to keep the distance between the work and the electrode guide constant while the depth of the working fluid is set at a predetermined depth for small-hole electrical discharge machining; and
executing small-hole electrical discharge machining.

* * * * *